United States Patent
Basterash et al.

(10) Patent No.: US 11,088,911 B2
(45) Date of Patent: Aug. 10, 2021

(54) PROBABILITY-BASED NETWORK DATA UPDATES

(71) Applicant: Trane International Inc., Davidson, NC (US)

(72) Inventors: Thomas Christopher Basterash, East Bethel, MN (US); Mark Martin, Chisago City, MN (US); Udhaya Kumar Dayalan, White Bear Lake, MN (US)

(73) Assignee: Trane International Inc., Davidson, NC (US)

( * ) Notice: Subject to any disclaimer, the term of this patent is extended or adjusted under 35 U.S.C. 154(b) by 0 days.

(21) Appl. No.: 16/504,662

(22) Filed: Jul. 8, 2019

(65) Prior Publication Data

US 2021/0014108 A1    Jan. 14, 2021

(51) Int. Cl.
*H04L 12/24* (2006.01)
*G06F 17/18* (2006.01)
*F24F 11/62* (2018.01)

(52) U.S. Cl.
CPC ............ *H04L 41/082* (2013.01); *F24F 11/62* (2018.01); *G06F 17/18* (2013.01); *H04L 41/0893* (2013.01); *H04L 41/142* (2013.01)

(58) Field of Classification Search
CPC . H04L 41/082; H04L 41/0893; H04L 41/142; H04L 12/2823; F24F 11/62; G06F 17/18; G06F 11/30; H04Q 9/00; G08B 29/26; G08B 31/00
USPC ........................................................ 709/224
See application file for complete search history.

(56) References Cited

U.S. PATENT DOCUMENTS

| | | | |
|---|---|---|---|
| 5,892,937 A | 4/1999 | Caccavale | |
| 5,933,832 A | 8/1999 | Suzuoka et al. | |
| 6,128,701 A | 10/2000 | Malcolm et al. | |
| 6,510,403 B1* | 1/2003 | Ghaseminejad | G08B 29/26 702/176 |
| 7,461,206 B2 | 12/2008 | Bhanoo et al. | |
| 7,734,872 B2 | 6/2010 | Bhanoo et al. | |
| 8,539,040 B2 | 9/2013 | Luna et al. | |
| 9,213,780 B2 | 12/2015 | Azar et al. | |
| 9,800,684 B2 | 10/2017 | Anand | |
| 2009/0099817 A1* | 4/2009 | Bieswanger | G06F 11/30 702/183 |

(Continued)

OTHER PUBLICATIONS

Y. Thomas Hou, Jianping Pan, Bo Li, & Shivendra S. Panwar, on Expiration-Based Hierarchical Caching Systems, IEEE Journal on Selected Areas in Communications vol. 22 No. 1, Jan. 2004, at 134.

*Primary Examiner* — Tan Doan
(74) *Attorney, Agent, or Firm* — Womble Bond Dickinson (US) LLP

(57) ABSTRACT

A data system controller can include one or more application modules configured to receive data from one or more devices, and a data service module in operative communication with the one or more application modules to provide data thereto. The data service module can be configured to receive data from the one or more devices. The data service module can be configured to update data from a respective device of the one or more devices when a data change probability of the respective device is above a probability threshold to provide updated data from the respective device to the one or more application modules.

19 Claims, 7 Drawing Sheets

(56) References Cited

U.S. PATENT DOCUMENTS

| | | |
|---|---|---|
| 2010/0174861 A1 | 7/2010 | Katz et al. |
| 2010/0332513 A1 | 12/2010 | Azar et al. |
| 2016/0042278 A1 | 2/2016 | Baughman et al. |
| 2016/0252266 A1* | 9/2016 | Ushirosako ............ G05B 15/02 |
| | | 700/278 |
| 2017/0353293 A1* | 12/2017 | Chandar ................. G06F 17/18 |
| 2019/0236955 A1* | 8/2019 | Hu ................... G08G 1/096844 |

* cited by examiner

PROBABILITY-BASED NETWORK DATA UPDATES

BACKGROUND

1. Technical Field

The present disclosure is directed to data systems, more specifically to data systems for reducing bandwidth usage.

2. Background of Related Art

Heating, ventilation, and air conditioning systems (HVAC systems) typically utilize one or more HVAC controllers, sensors, thermostats, outdoor units, indoor units, dampers, and/or other equipment to monitor and control environmental conditions in a building. Such components may include computer-based controllers with remotely-updateable software or firmware. HVAC devices which can receive software updates over a network have become popular since they allow new features, bug fixes, upgrades and other improvements to be easily implemented. However, data updating over networks can be limited by available bandwidth, or can consume too much bandwidth too frequently, for example. The more data that is transmitted, the more network resources are consumed. Often, the data hasn't changed (or hasn't changed much) and transmitting of the data is essentially wasting network bandwidth.

SUMMARY

In one aspect, the present disclosure is directed to a data system controller. The data system controller can include one or more application modules configured to receive data from one or more devices, and a data service module in operative communication with the one or more application modules to provide data thereto. The data service module can be configured to receive data from the one or more devices. The data service module can be configured to update data from a respective device of the one or more devices when a data change probability of the respective device is above a probability threshold to provide updated data of the respective device to the one or more application modules.

The data service module can be configured to not update the data of the respective device and to provide stored data to the one or more application modules when the data change probability of the respective device is not above the probability threshold. The data service module can be configured to determine the data change probability.

The data change probability can be a function of time-since-last-read value, number of total reads, and number of data changed reads. The data service module can be configured to read the data change probability from a probability array having a probability associated with each of a plurality of time-since-last-read values.

Each probability can be calculated as a number of data changed reads at a respective time-since-last-read value divided by a total number of reads at the respective time-since-last-read value. Each probability of the probability array can be set initially above the probability threshold.

The data service module can be configured to update the data at a maximum time-since-last-read value regardless of probability. For example, the maximum time-since-last-read value can be 120 minutes, or any other suitable value.

In a first state, the data service module can be configured to read the data change probability from a first probability array having a first probability associated with each of a plurality of time-since-last-read values. In a second state, the data service module can be configured to read the data change probability from a second probability array having a second probability associated with each of a plurality of time-since-last-read values.

The controller can be an HVAC controller. Any other suitable controller is contemplated herein.

In another aspect, the present disclosure is directed to a non-transitory computer readable medium, comprising computer executable instructions configured to cause a computer to execute a method. The method can include updating data of a device on a network based on a probability that the data of the device has changed. For example, the method can include determining a time-since-last-read value, looking up a probability in a probability array associated with the time-since-last-read value, comparing the probability to a probability threshold, and if the probability is above the probability threshold, updating the data by requesting and/or receiving the updated data from the device.

If the probability is not above the probability threshold, the method can include retrieving stored data instead of updating the data. In certain embodiments, the method can include comparing the time-since-last-read value to a maximum time-since-last-read, and if the time-since-last-read exceeds the maximum time-since-last-read, updating the data.

The method can include updating each probability of the probability array in real time. The method can include iterating the probability in the probability array to increase the probability toward and/or above the probability threshold to cause adaptive reset of the probability.

In yet another aspect, the present disclosure is directed to a method that can include updating data of a device on a network based on a probability that the data of the device has changed. The method can include determining a time-since-last-read value, looking up a probability in a probability array associated with the time-since-last-read value, comparing the probability to a probability threshold, and if the probability is above the probability threshold, updating the data by requesting and/or receiving the updated data from the device. If the probability is not above the probability threshold, the method can include retrieving stored data instead of updating the data.

BRIEF DESCRIPTION OF THE DRAWINGS

Various embodiments of the disclosed system and method are described herein with reference to the drawings wherein.

Figure 1:
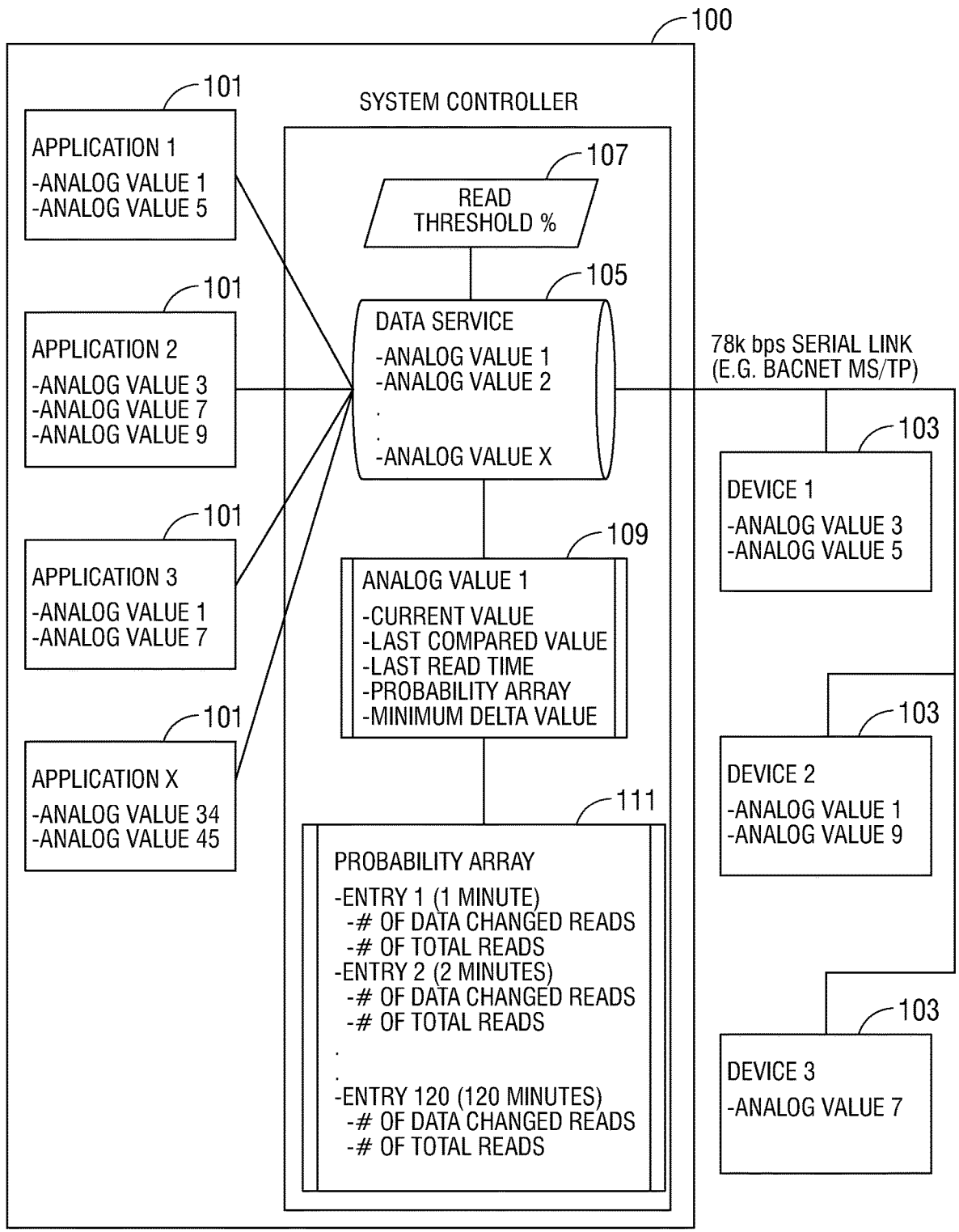
FIG. 1 is schematic view of an embodiment of controller in accordance with the present disclosure.

The various aspects of the present disclosure mentioned above are described in further detail with reference to the aforementioned figures and the following detailed description of exemplary embodiments.

DETAILED DESCRIPTION

Particular illustrative embodiments of the present disclosure are described hereinbelow with reference to the accompanying drawings; however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but merely as a basis for the claims and as a representative basis for teaching one skilled in the art to variously employ the present disclosure in virtually any appropriately detailed structure. In this description, as well as in the drawings, like-referenced numbers represent elements which may perform the same, similar, or equivalent functions. The word "exemplary" is used herein to mean "serving as an example, instance, or illustration." Any embodiment described herein as "exemplary" is not necessarily to be construed as preferred or advantageous over other embodiments. The word "example" may be used interchangeably with the term "exemplary."

The present disclosure is described herein in terms of functional block components and various processing steps. It should be appreciated that such functional blocks and/or processing steps may be realized by any number of hardware and/or software components configured to perform the specified functions. For example, the present disclosure may employ various integrated circuit components, e.g., memory elements, processing elements, logic elements, look-up tables, and the like, which may carry out a variety of functions under the control of one or more microprocessors or other control devices.

Similarly, the software elements of the present disclosure may be implemented with any programming or scripting language such as C, C++, C#, Java, Javascript, assembler, PERL, Python, PHP, R, or the like, with the various algorithms being implemented with any combination of data structures, objects, processes, routines or other programming elements. The object code created may be executed by any device, on a variety of operating systems.

It should be appreciated that the particular implementations described herein are illustrative of the disclosure and its best mode and are not intended to otherwise limit the scope of the present disclosure in any way. Examples are presented herein which may include data items which are intended as examples and are not to be construed as limiting. Indeed, for the sake of brevity, conventional data networking, application development and other functional aspects of the systems (and components of the individual operating components of the systems) may not be described in detail herein. It should be noted that many alternative or additional functional relationships or physical or virtual connections may be present in a practical electronic system or apparatus. In the discussion contained herein, the terms user interface element and/or button are understood to be non-limiting, and include other user interface elements such as, without limitation, pushbutton, a proximity sensor, a hyperlink, clickable image, and the like.

As will be appreciated by one of ordinary skill in the art, aspects of the present disclosure may be embodied as a method, a data processing system, a device for data processing, and/or a computer program product. Certain aspects of the present disclosure may take the form of a computer program product on a computer-readable storage medium having computer-readable program code means embodied in the storage medium. Any suitable computer-readable storage medium may be utilized, including hard disks, CD-ROM, DVD-ROM, optical storage devices, magnetic storage devices, semiconductor storage devices (e.g., EEPROM, mask ROM, flash memory, USB thumb drives) and/or the like.

Computer program instructions embodying certain aspects of the present disclosure may also be stored in a computer-readable memory that may direct a computer or other programmable data processing apparatus to function in a particular manner, such that the instructions stored in the computer-readable memory produce an article of manufacture, including instruction means, that implement the function specified in the description or flowchart block(s). The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the present disclosure.

One skilled in the art will also appreciate that, for security and/or any other suitable reason, any components, data structures, and communications links may include any of various suitable security features, such as firewalls, access codes, encryption, de-encryption, compression, decompression, and/or the like. In some instances, the steps recited herein may be executed in any order and are not limited to the order presented.

Certain embodiments are disclosed herein which operate in accordance with the ZigBee® wireless mesh networking standards, however, it should be understood that embodiments of the present disclosure are applicable to any wired or wireless network architecture, including without limitation Z-Wave®, in which the features and advantages discussed herein may be advantageously employed.

Referring to FIG. 1, a data system 100 (e.g., a system controller for an HVAC system) can include one or more application modules 101 configured to receive and consume data from one or more devices 103 (e.g., one or more sensors). In certain embodiments, one or more application modules 101 can be configured to consume data from a plurality of devices 103. In embodiments having a plurality of application modules 101, each application module 101 can perform a different function than the other application modules 101, for example. Any suitable application module is contemplated herein.

The system 100 can include a data service module 105 in operative communication with the one or more application modules 101 to provide data thereto. The data service module can be configured to receive data from the one or more devices. When one or more application modules 101 requests data, the data service module 105 can be configured to update data from a respective device 103 of the one or more devices 103 when the data change probability of the requested data from device 103 is above a probability threshold (e.g., set manually or automatically in threshold module 107). The probability threshold can be any suitable value (e.g., above about 50%).

The data service module 105 can be configured to not update the data from respective device 103 and to provide stored data (e.g., stored in storage module 109) to the one or more application modules 101 when the data change probability of the requested data from respective device 103 is not above the probability threshold. The data service module 105 can be configured to determine the data change probability.

As shown in FIG. 1, the data change probability can be a function of a time-since-last-read value, a number of total reads, and a number of data changed reads (e.g., the number of times that the data changed when read). The data service module 105 can be configured to read the data change probability from a probability array 111 having a probability associated with each of a plurality of time-since-last-read values.

Each probability can be calculated as a number of data changed reads at a respective time-since-last-read value divided by a total number of reads at the respective time-since-last-read value. Any other suitable calculation for data change probability and/or source for the data change probability is contemplated herein.

In certain embodiments, each probability of the probability array 111 can be initially set above the probability threshold. Any suitable initial values in the probability array 111 are contemplated herein.

The data service module 105 can be configured to update the data at a maximum time-since-last-read value regardless of probability. For example, the maximum time-since-last-read value can be 120 minutes, or any other suitable value. In this regard, readings can always be taken at some regular interval (e.g., longer than normal) to provide assurance that the data service module 105 does not completely ignore a device 103 and that the data is current.

In certain embodiments, in a first state, the data service module 105 can be configured to read the data change probability from a first probability array 111 having a first probability associated with each of a plurality of time-since-last-read values. In a second state, the data service 105 module can be configured to read the data change probability from a second probability array (not shown) having a second probability associated with each of a plurality of time-since-last-read values. The states can be any suitable states (e.g., building occupancy, time of day, etc.).

In certain embodiments, the controller can be an HVAC controller. Any other suitable controller is contemplated herein.

Figure 2:
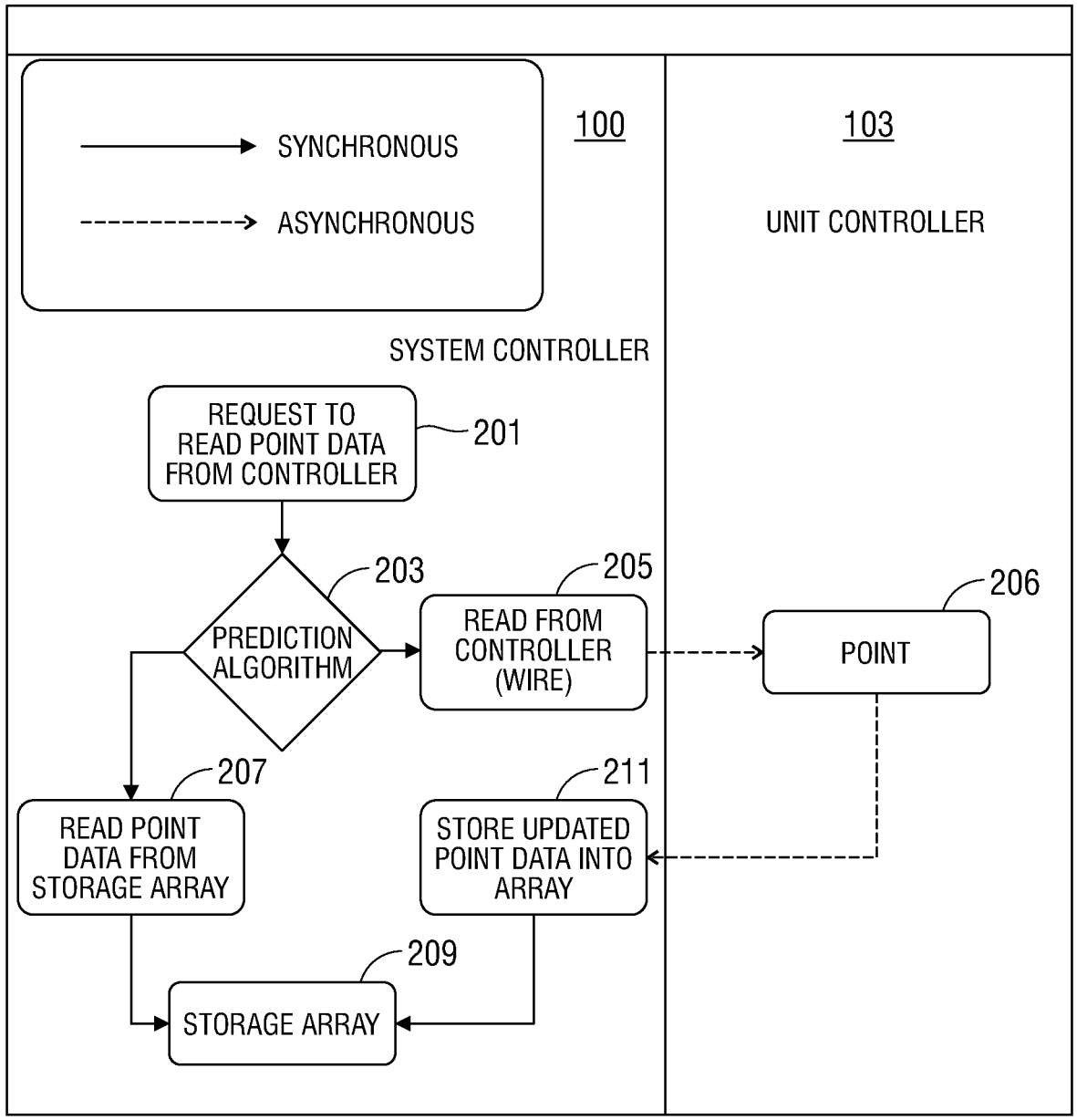
FIG. 2 is a schematic diagram of an embodiment of a system in accordance with this disclosure, showing a partial functional diagram of a controller of FIG. 1.

An overview of an embodiment of a system in accordance with the present disclosure is shown in FIG. 1. Turning now to FIG. 2, a schematic diagram of an embodiment of a system in accordance with the present disclosure is illustrated, showing a partial functional diagram of a controller of FIG. 1. Within the controller 100, a number of application modules 101 can all require data from various devices 103 on the network. Any number of these application modules 101 may require the same piece of data from the same device 103, for example. Referring additionally to FIG. 2, when an application module 101 needs data, it can request the data (e.g., with a request 201) from the data service module 105. The data service module 105 can use a probability algorithm 203 to decide whether or not to actually request (e.g., block 205) and/or read the data point 206 from the device 103 on the network, or to read (e.g., block 207) from a stored array 209. If read from the device 103, the array 209 can be updated (e.g., at block 211). By using this probability algorithm 203, network utilization, e.g., on a low bandwidth serial link, can be maximized.

In another aspect, the present disclosure is directed to a non-transitory computer readable medium, comprising computer executable instructions configured to cause a computer to execute a method. The method can include updating data from a device 103 on a network based on a probability that the data of the device 103 has changed. For example, the method can include determining a time-since-last-read value, looking up a probability in a probability array 111 associated with the time-since-last-read value, comparing the probability to a probability threshold, and if the probability is above the probability threshold, updating the data by requesting and/or receiving the updated data from the device 103.

If the probability is not above the probability threshold, the method can include retrieving stored data instead of updating the data. In certain embodiments, the method can include comparing the time-since-last-read value to a maximum time-since-last-read, and if the time-since-last-read exceeds the maximum time-since-last-read, updating the data.

The method can include updating each probability of the probability array 111 in real time. The method can include periodically iterating the probability in the probability array 111 to increase the probability toward and/or above the probability threshold to cause adaptive reset of the probability. In certain embodiments, iterating can include adding a suitable value to the probability (e.g., adding 1%). In certain embodiments, iterating the probability can include adding a value (e.g., an integer, e.g., 1) to the number of data changed reads. Any other suitable iteration or combinations thereof configured to increase the probability is contemplated herein (e.g., subtracting from the total number of reads).

In yet another aspect, the present disclosure is directed to a method that can include updating data from a device 103 on a network based on a probability that the data of the device has changed. The method can include determining a time-since-last-read value, looking up a probability in a probability array 111 associated with the time-since-last-read value, comparing the probability to a probability threshold, and if the probability is above the probability threshold, updating the data by requesting and/or receiving the updated data from the device 103. If the probability is not above the probability threshold, the method can include retrieving stored data instead of updating the data.

Figure 3A:
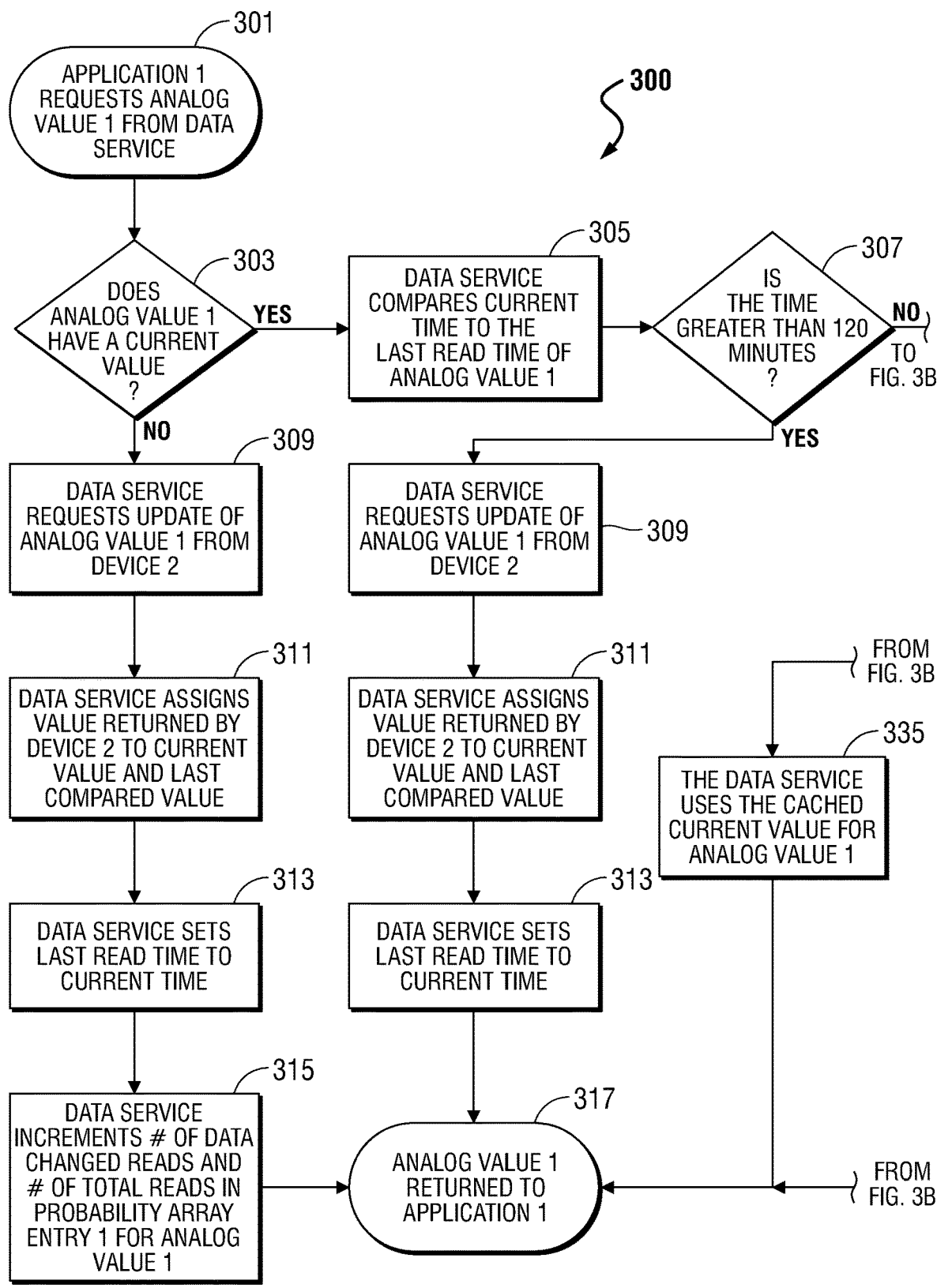
FIGS. 3A and 3B are a flow diagram of an embodiment of a method in accordance with this disclosure.
Figure 3B:
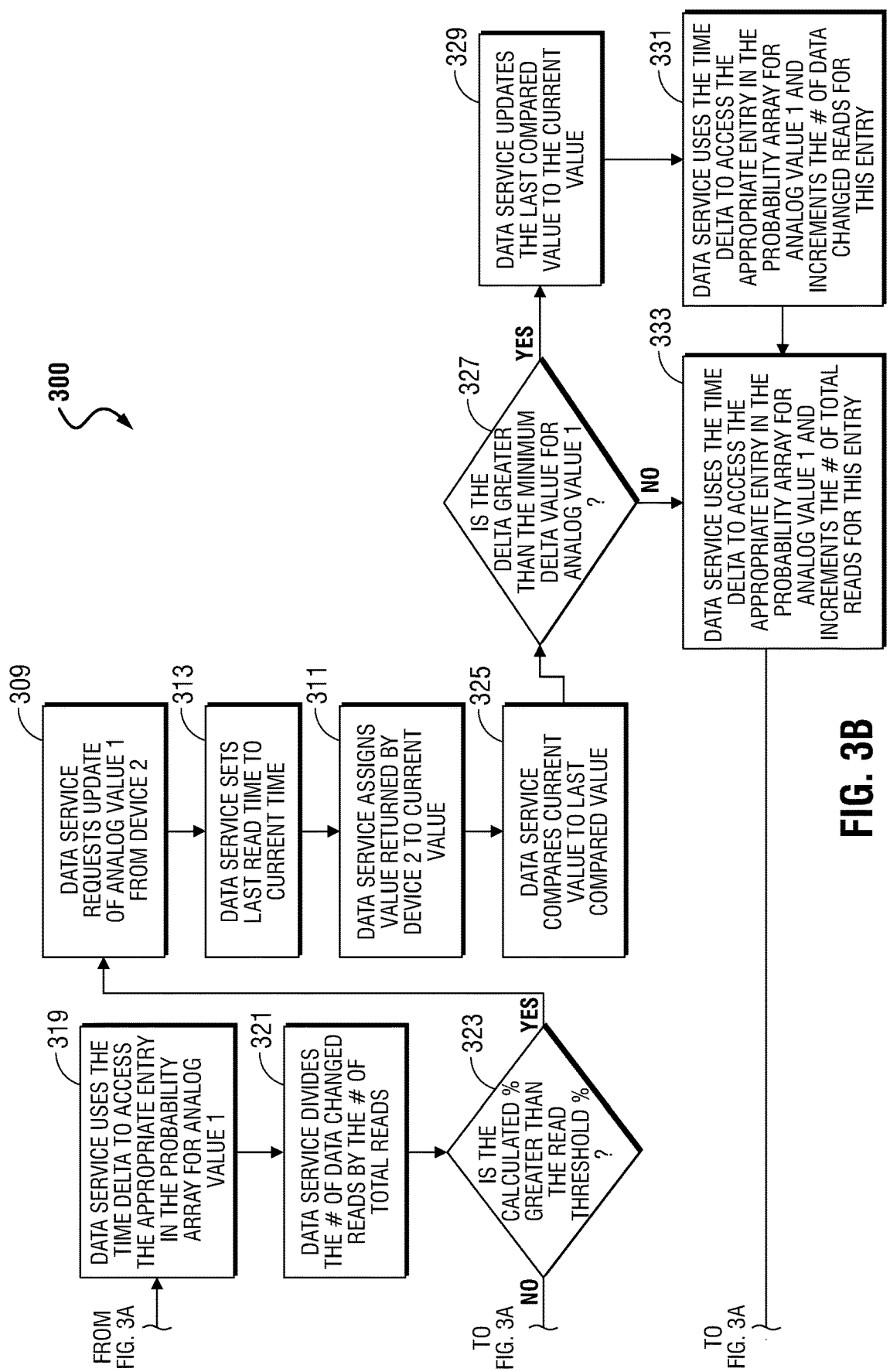

An embodiment of a method 300 is shown in FIGS. 3A and 3B. FIGS. 3A and 3B show embodiments of various sequences that can occur when data is requested (e.g., at block 301) from the data service module 105 by an application module 101. As shown in FIGS. 3A and 3B, when a data request is made, the data service module 105 can start by checking (e.g., at blocks 303, 305, and 307) whether that piece of data has ever been requested before (e.g., if there is a valid stored value in storage 109). If it has not been requested before, the data service module 105 can communicate with a device 103 over the network (e.g., wirelessly or wired), read the data, and return it to the caller (e.g., as shown in blocks 309, 311, 313, 315, and 317). The data service module 105 can also update all of the data associated with that point, e.g., the Current Value, Last Compared Value, and Last Read Time. If the data has been requested before, the data service module 105 can check to see whether it has been more than a maximum time (e.g., 120 minutes), e.g., at block 307, since the data was requested from the device 103. If it has been more than the maximum time, the data service module 105 can go out on the network, read the data, and return it to the caller (e.g., and updating all appropriate information in the process), e.g., as shown in blocks 309, 311, 313 and 317.

If the data has been requested before, and it has been less than the maximum amount of time since it was last requested, the data service module 105 can perform some calculations to see if it should go out on the network and read the data. The data network module 105 can use the time delta between the last read and the current read to reference an entry in the probability array 111 for this specific data point (e.g., at block 319). The data service module 105 can then use this data to calculate the odds that the data has changed by a significant enough amount to warrant updating the data by receiving updated data over the network from the respective device 103 (e.g., at blocks 321 and 323).

If the odds that the data has changed are great enough, the data can be read via the network and information about the data can be updated, e.g., as shown at blocks 323 and ensuing blocks 309, 311, 313, 325, 327, 329, 331, and 333). If the odds of a change are sufficiently low, the data service module 105 can return the last read value of the data to the caller application module 101 (e.g., as shown at block 335). The data can be updated in any suitable manner (e.g., as shown in blocks 325, 327, 329, 331, and 333). The method 300 can include any other suitable portions, e.g., as shown or otherwise, and any other suitable flow is contemplated herein.

Figure 4:
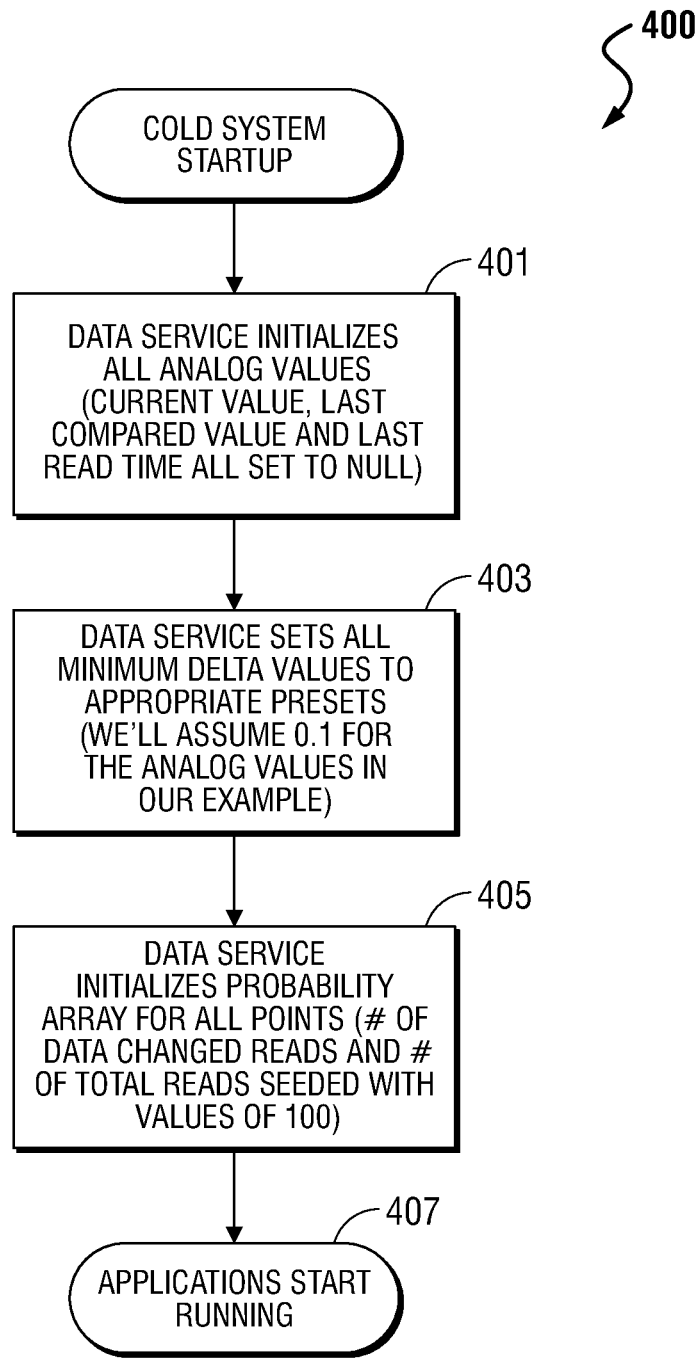
FIG. 4 is a flow diagram of an embodiment of a "cold" system startup method in accordance with this disclosure.
Figure 5:
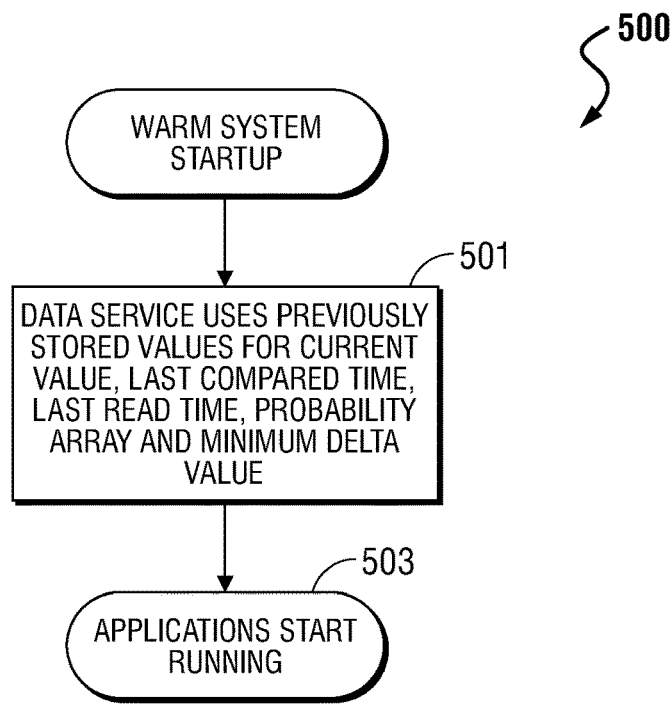
FIG. 5 is a flow diagram of an embodiment of a "warm" system startup method in accordance with this disclosure.

Referring additionally to FIGS. 4 and 5, an embodiment for a "cold" system startup method 400 and a "warm" system startup method 500 for the controller 100 are shown. In certain embodiments, when the system starts, it can either start in a "cold" mode or "warm" mode. The cold startup can be the process that is followed the first time the system is initialized, e.g., initially or after reset. The warm startup can be the process that is followed when the system has already been initialized.

In certain embodiments of the cold system startup method 400, the data service module 105 can initialize the probability array 111 for all points (e.g., number of Data Changed Reads and number of Total Reads seeded with values of 100, for example), e.g., as shown in blocks 401 and 405. The data service module 105 can initialize all Analog Values (Current Value, Last Compared Value and Last Read Time all set to NULL). The data service module 105 can set all Minimum Delta Values to appropriate presets (e.g., 0.1 for the Analog Values, or any other suitable number) as shown in block 403. After setting the values, in any suitable order, the application modules 101 can start running, e.g., as shown in block 407.

As shown in FIG. 5, in certain embodiments of the warm system startup method 500, the data service module 105 can use previously stored values for any suitable values, e.g., Current Value, Last Compared Time, Last Read Time, Probability Array and/or Minimum Delta Value (e.g., as shown in block 501). After using such values, the application modules 101 can start running (e.g., as shown in block 503).

Figure 6:
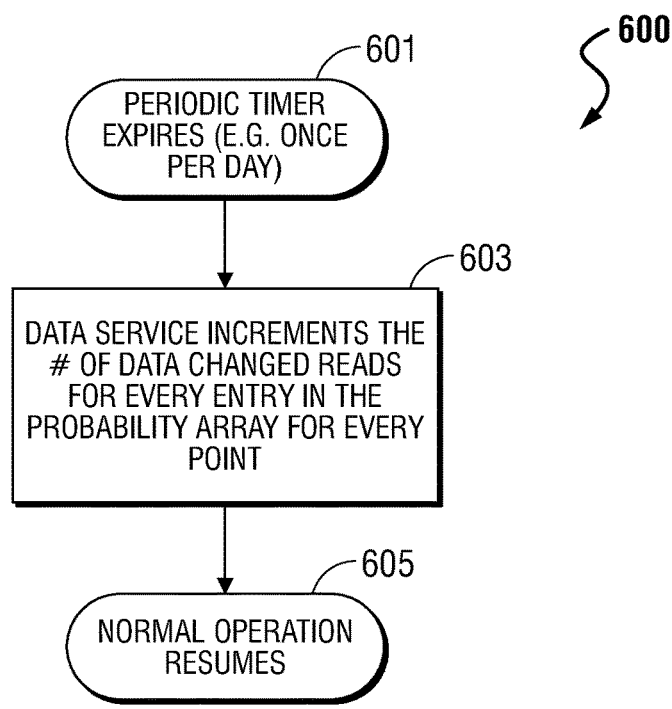
FIG. 6 is a flow diagram of an embodiment of a system maintenance method in accordance with this disclosure.

Referring additionally to FIG. 6, a method 600 for maintaining the system (e.g., control module 105) is shown. In certain systems, there are may be pieces of data that rarely change. Those pieces of data may eventually end up with probability arrays 111 where most (or all) entries fall below the data read threshold. In these situations, the controller 100 can periodically adjust the probability for each entry to bring it back up above the threshold. For example, a periodic timer can expire (e.g., as shown in block 601) and the data service module can increment all data change reads up at least one value (e.g., as shown in block 603), then normal operation can resume (e.g., as shown in block 605). That way, if a piece of data that was slow to change suddenly started changing more rapidly (e.g., due to some other system change), the system can adjust the probability array 111 accordingly and read it more frequently. Any other suitable adjustments to the probability array are contemplated herein to maintain an intended function of the control as appreciated by those having ordinary skill in the art in view of this disclosure.

Figure 7:
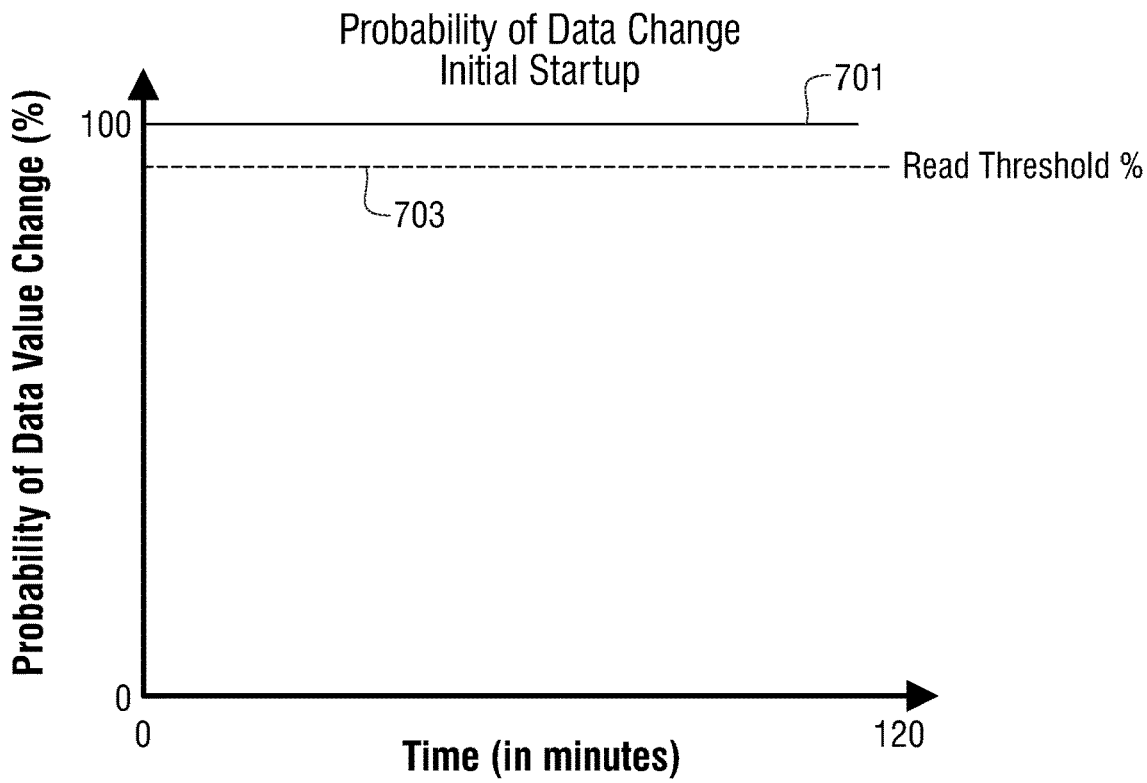
FIG. 7 shows a chart of an embodiment of the data read probability at an initial start-up.
Figure 8:
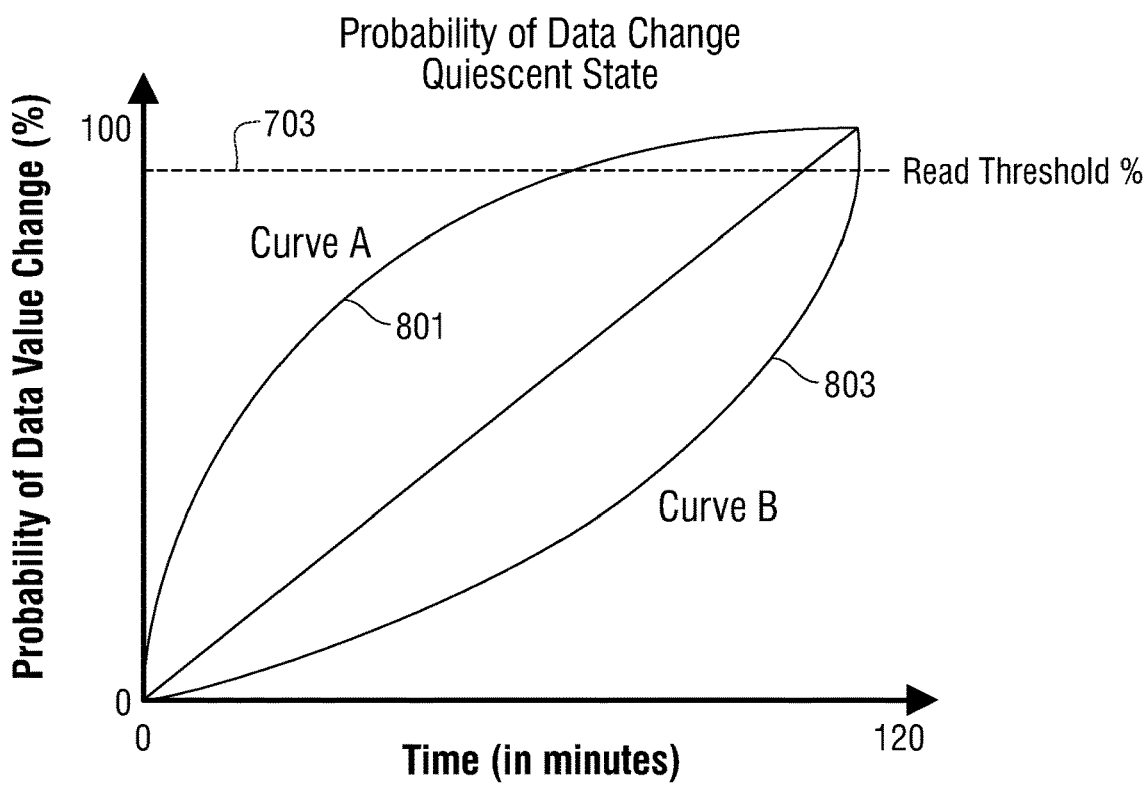
FIG. 8 shows a chart of an embodiment of the data read probability at a steady state.

Referring additionally to FIGS. 7 and 8, an embodiment of probability array data is shown. The chart in FIG. 7 shows what the probability arrays 111 for the various points can be set to just after the initial startup. As shown, in certain embodiments, the probability (e.g., shown by line 701) that the data has changed for all points can be 100% or close to 100% and/or any other suitable value above a threshold (e.g., as shown by line 703). As such, the data will always be read from the devices 103 over network. As the system continues to operate, over time, the data in the probability arrays 111 will start to change based on how often the data actually changes.

FIG. 8 shows an embodiment of a steady state for a plurality of probability arrays 111 (e.g., one for each analog value of a device 103, for example). Referring to FIG. 8, data that changes more frequently may have a probability array 111 that has a probability curve shown as Curve A 801. Data that changes less frequently may have a probability array 111 that has a probability curve shown as Curve B 803. With each analog value/data point having a unique probability array that is based on how often that data changes, the data is only read from the device 103 over the network as often as is needed to maintain reliable/accurate information. In other words, in certain embodiments, data that changes very slowly/rarely is not read as often since it does not need to be. This frees up network bandwidth for data reads that are needed more often for data that changes more frequently.

Embodiments use probability to determine whether or not the data should be refreshed, or a cached value used. The more data we read over a network, the more network bandwidth we utilize. All networks have a theoretical maximum bandwidth available. As this theoretical limit is approached, bandwidth is used up. In these situations, data reads will start to be delayed (or fail), thus resulting in poor performance for the applications trying to reference the data. There are currently a number of processes in place to help maximize data "freshness" while minimizing bandwidth utilization. One such process is change of value. Instead of an application asking for data, data is only transmitted when the value changes by a certain pre-determined amount. A problem with this method is that if the application/equipment sending the data fails for some reason, the consumer of the data has no way of knowing (without doing some kind of a heartbeat or poll). Another method is having the application poll various other pieces of equipment or applications for data on an as-needed basis. A problem with this method is that available network bandwidth is wasted by polling for data that was just read in the recent past. Or, data may be frequently polled even though it changes very slowly over time. In either of these methods, the available network bandwidth is not effectively used.

To better utilize the available network bandwidth, embodiments utilize a probability-based polling algorithm, for example. When data is to be read, the probability of the data having changed since the last reading is calculated. If this probability falls below a certain threshold, the data is not actually read and a cached value of the data is returned to the calling application. Embodiments keep the data current, while maximizing network bandwidth utilization.

For each piece of data that is accessed by an application over a network interface, a probability algorithm is applied.

When a request for data is made by an application, the probability of the data having changed is calculated and the actual read of the data is performed only if the probability of the data changing is above a certain threshold, for example. Every time data is actually read, the probability algorithm is automatically updated to provide a more accurate representation of how often the data changes. As such, the longer the system runs, the better the network bandwidth utilization becomes. At the same time, the applications requesting data from the network are able to get the needed information in a timely manner, while having a high confidence that the data is accurate.

Embodiments can include a controller that has one or more applications running on it that periodically request data from other devices residing on a common network. Embodiments of a controller can have an application or service running that is dedicated to retrieving this information from the network for the other applications, e.g., the data service module 105. When one of the applications needs data from a device on the network, it can make a call to the data service module requesting the information. Each piece of data that the data service module 105 maintains can contain a number of properties/values. These can include, but are not limited to:

Current Value
Last Compared Value
Last Read Time
Probability Array
Minimum Delta Value The probability array 111 can be a structure array with each entry in the array containing the following:

Number of Data Changed Reads
Number of Total Reads

The probability array 111 can be structured such that each entry represents a time delta. In other words, as an example, the first entry can represent 1 minute, the second entry can represent 2 minutes, etc. At initial startup, the probability array 111 could be seeded with some initial values for each entry as described above.

When an application requests a piece of data from the data service module 105, the data service module 105 can perform some actions before it actually goes out on the network and requests the data. First, it can look to see if it has a Current Value. If it doesn't, the data can be requested from the network. If it does, it can look to see when the last time the data was read from the network by checking the Last Read Time value. If this time delta exceeds the number of entries in the Probability Array, the data can be requested from the network.

If the time delta falls within the bounds of the probability array 111, the probability that the data has changed is calculated. The entry in the probability array 111 that corresponds with the current time delta can be accessed. The Number of Data Changed Reads can be divided by the Number of Total Reads for the specific time delta entry. If the calculated percentage falls below a certain threshold, the Current Value of the data can be returned to the calling application, without actually reading the data from the network.

If the calculated percentage is above the threshold, the data can be requested from the network and stored in the Current Value. The Last Read Time can also updated with the current time. The new data can be compared with the Last Compared Value and the Minimum Delta Value. If the delta in the data value exceeds the Minimum Delta Value, the Number of Data Changed Reads for the current time delta in the probability array 111 can be incremented and the Last Compared Value can be updated. The Number of Total Reads for the current time delta in the Probability Array can also be incremented. If the delta in the data value is below the Minimum Delta Value, only the Number of Total Reads for the current time delta in the probability array 111 can be incremented. The Current Value can be updated, but the Last Compared Value may not updated with the new reading.

This way, if the value continues to change by very small amounts over time, the minimum delta will eventually be exceeded and increase the Data Changed Reads count in the probability array. For non-analog data (binary or multi-state data) there may not be a Minimum Delta Value present. The new data may be compared to the old data to see if it is different, for example.

As can be seen, as the system runs, data that changes more slowly will start to see entries in the front of the probability array 111 with a lower and lower probability of the data changing. As such, when this data is requested by other applications, it will be requested from the network less frequently because it is known to change more slowly. Conversely, for data that changes quickly, the early entries in the probability array 111 will maintain a high probability, thus informing the data service module 105 that it must go out on the network to retrieve this information more often. The longer the system operates, the more accurate the probability calculations become and the more effectively the available network bandwidth is utilized.

Because there can be periodic changes with how often data may change, it may also be desirable to implement some type of a periodic reset in the values held in the probability array 111. One such embodiment of this would be to periodically increment the Number of Data Changed Reads in each entry in the Probability Array, even if the data has not been read from the network. This would eventually force the data service module 105 to go out and actually read the data again from time to time, even if the probability of it changing is actually low. In this way, if the characteristics of the data changes over time, the data service module 105 can be able to automatically update its probability array 111 over time.

Certain embodiments can include multiple probability arrays 111, e.g., as described above, such as one for "busy" (e.g., building occupied) times and one for "slow" (e.g., unoccupied) times for each data type. In the busy times, the probability array may contain higher probabilities that the data had changed, while in the slow times, the probability array may have lower probabilities that the data had changed, thus providing better bandwidth utilization based on the time the data is being requested.

Any suitable data (e.g., analog or digital) is contemplated for any embodiments disclosed herein, and any suitable comparison of data is contemplated herein. Any suitable combination of embodiments and/or any suitable portion thereof is contemplated herein. Any module, application, service, or other related portion disclosed herein can include any suitable computer hardware and/or software (e.g., configured to perform the disclosed function thereof or otherwise) as appreciated by those having ordinary skill in the art in view of this disclosure.

Particular embodiments of the present disclosure have been described herein, however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in any appropriately detailed structure.

What is claimed is:

1. A method, comprising:
   determining, by a device comprising a processor, that a maximum bandwidth of a communication link between a group of sensors and a system controller is below a defined bandwidth threshold; and
   in response to the maximum bandwidth being below the defined bandwidth threshold, invoking, by the device, a bandwidth savings procedure to satisfy a request for sensor data from a sensor of the group of sensors that communicate via the communication link, comprising:
      in response to a probability of a significant change in data being above a defined probability threshold, requesting the sensor data from the sensor; and
      in response to the probability being below the defined probability threshold, satisfying the request using locally stored sensor data that was previously received from the sensor.

2. The method of claim 1, further comprising:
   determining a time-since-last-read value;
   looking up the probability in a probability array associated with the time-since-last-read value;
   comparing the probability to the defined probability threshold; and
   in response to the comparing, satisfying the request according to the bandwidth savings procedure.

3. The method of claim 2, further comprising:
   comparing the time-since-last-read value to a maximum time-since-last-read; and
   if the time-since-last-read exceeds the maximum time-since-last-read, requesting the sensor data independent of the probability being below the defined probability threshold.

4. The method of claim 2, further comprising iteratively updating the probability in the probability array.

5. A data system controller, comprising:
   one or more application modules configured to receive data from one or more devices, wherein the one or more application modules represent one or more applications being executed by a processor of the data system controller and the one or more devices represent one or more sensors communicatively coupled to the data system controller via a communication link having a maximum bandwidth;
   a data service module, indicative of a service application being executed by the data system controller, in operative communication with the one or more application modules to provide data thereto, wherein the data service module is configured to request data from the one or more devices via the communication link, wherein, in response to a determination that the maximum bandwidth supported by the communication link is below a defined threshold, the data service module requests data updates from a respective device of the one or more devices when a data change probability of the requested data from the respective device is above a probability threshold to provide updated data of the respective device to the one or more application modules, and
   wherein the data service module is configured to not update the data from the respective device and to provide stored data to the one or more application modules when the data change probability of the requested data from the respective device is not above the probability threshold.

6. The controller of claim 1, wherein the data service module is configured to determine the data change probability.

7. The controller of claim 1, wherein the data change probability is a function of a time-since-last-read value, a number of total reads, and a number of data changed reads.

8. The controller of claim 7, wherein the data service module is configured to read the data change probability from a probability array having a probability associated with each of a plurality of time-since-last-read values.

9. The controller of claim 8, wherein each probability is calculated as a number of data changed reads at a respective time-since-last-read value divided by a total number of reads at the respective time-since-last-read value.

10. The controller of claim 9, wherein each probability of the probability array is initially set above the probability threshold.

11. The controller of claim 8, wherein the data service module is configured to update the data at a maximum time-since-last-read value regardless of the data change probability.

12. The controller of claim 11, wherein the maximum time-since-last-read value is 120 minutes.

13. The controller of claim 1, wherein, in a first state, the data service module is configured to read the data change probability from a first probability array having a first probability associated with each of a plurality of time-since-last-read values, and wherein, in a second state the data service module is configured to read the data change probability from a second probability array having a second probability associated with each of a plurality of time-since-last-read values.

14. The controller of claim 1, wherein the controller is an HVAC controller.

15. A non-transitory computer readable medium, comprising computer executable instructions configured to cause a computer to execute a method, the method comprising:
   determining that a maximum bandwidth of a communication link between a group of sensors and a system controller is below a defined bandwidth threshold; and
   in response to the maximum bandwidth being below the defined bandwidth threshold, invoking a bandwidth savings procedure to satisfy a request for sensor data from a sensor of the group of sensors that communicate via the communication link, comprising:
      in response to a probability of a significant change in data being above a defined probability threshold, requesting the sensor data from the sensor; and
      in response to the probability being below the defined probability threshold, satisfying the request using locally stored sensor data that was previously received from the sensor.

16. The non-transitory computer readable medium of claim 15, wherein the method includes:
   determining a time-since-last-read value;
   looking up the probability in a probability array associated with the time-since-last-read value;
   comparing the probability to the defined probability threshold; and
   in response to the comparing, satisfying the request according to the bandwidth savings procedure.

17. The non-transitory computer readable medium of claim 16, wherein the method includes:

comparing the time-since-last-read value to a maximum time-since-last-read; and if the time-since-last-read exceeds the maximum time-since-last-read, requesting the sensor data independent of the probability being below the defined probability threshold.

18. The non-transitory computer readable medium of claim 16, wherein the method includes:

periodically iterating the probability in the probability array to increase the probability toward and/or above the probability threshold to cause adaptive reset of the probability.

19. The non-transitory computer readable medium of claim 15, wherein the method includes:

updating the probability in real time.

* * * * *